United States Patent [19]
Fleck

[11] 4,130,321
[45] Dec. 19, 1978

[54] PRESSURE-REGULATING VALVE FOR VEHICULAR BRAKING SYSTEMS

[75] Inventor: Franz Fleck, Frankfurt-Nied, Fed. Rep. of Germany

[73] Assignee: ITT Industries, Inc., New York, N.Y.

[21] Appl. No.: 811,006

[22] Filed: Jun. 29, 1977

[30] Foreign Application Priority Data
Aug. 5, 1976 [DE] Fed. Rep. of Germany ....... 2635154

[51] Int. Cl.² .............................................. B60T 7/00
[52] U.S. Cl. ...................................... 303/13; 188/271
[58] Field of Search .................. 188/271; 303/13, 14, 303/25, 48, 68; 192/12 A, 12 C

[56] References Cited
U.S. PATENT DOCUMENTS

| | | | |
|---|---|---|---|
| 3,302,755 | 2/1967 | Botterill et al. | 188/271 |
| 3,893,552 | 7/1975 | Dahl | 192/12 C |
| 4,004,660 | 1/1977 | Shore et al. | 188/271 |

FOREIGN PATENT DOCUMENTS 466436  5/1937  United Kingdom ..................... 188/271

Primary Examiner—George E. A. Halvosa
Attorney, Agent, or Firm—John T. O'Halloran; Alfred C. Hill

[57] ABSTRACT

There is disclosed a pressure-regulating valve which serves to control friction brakes dependent on the braking effect of a hydrodynamic brake. In order to achieve a full pressure decrease in the friction brakes, these are connected to an unpressurized reservoir while the hydrodynamic brake is operating at full effect.

4 Claims, 3 Drawing Figures

PRESSURE-REGULATING VALVE FOR VEHICULAR BRAKING SYSTEMS

BACKGROUND OF THE INVENTION

The present invention relates to a pressure-regulating valve for vehicular braking systems which is to be inserted between a brake-pedal-controlled pressure-fluid source and wheel cylinders and includes, on the side closest to the wheel cylinders, a pressure chamber the volume of which is variable as a result of the displacement of a plunger piston by means of a shifting device into an end position against the pressure from the pressure-fluid source, the displacement being dependent on the braking action of a supplementary braking arrangement, with the plunger piston having a pressure-fluid passageway including a closure member movable into an open position by abutment of the plunger piston against the shifting device.

Such pressure-regulating valves are used, for example, in braking systems in which a hydrodynamic brake is provided in addition to the hydraulically-operated mechanical brakes. The pressure-regulating valve provides for relief of the mechanical friction brakes in the same measure as the hydrodynamic brake takes effect.

In order to achieve a full pressure decrease in the brake cylinders of the friction brake when the hydrodynamic brake starts taking effect, it is necessary for the plunger piston to move back a large amount. Due to elasticities, the volume to be taken up may become considerably large which necessitates a large displacement travel of the plunger piston and consequently leads to a pressure-regulating valve of substantial size. In view of the fact that the absorption capacity of various braking systems is different due to different elasticities and brake sizes, different braking systems require also pressure-regulating valves of different sizes. Of course it would also be possible to use a large pressure-regulating valve for smaller braking systems. However, this possibility is ruled out in the majority of cases because of reasons of cost or space.

SUMMARY OF THE INVENTION

It is the object of the present invention to provide a pressure-regulating valve of the type initially referred to, in which a complete pressure decrease is obtainable also in the case of different absorption capacities and which is also adapted for use in systems having a large absorption capacity without necessitating substantial changes.

A feature of the present invention is the provision of an improvement to a pressure-regulating valve for vehicular braking systems which is inserted between a brake-pedal-controlled pressure-fluid source and wheel brake cylinders and includes on the side closest to the brake cylinders a pressure chamber the volume of which is variable as a result of the displacement of a plunger piston by means of a shifting device into an end position against the pressure of the source, the displacement being dependent on the braking action of a supplementary braking arrangement, with the plunger piston having a pressure-fluid passageway including a closure member movable into an open position by abutment of the plunger piston against the shifting device, the improvement comprising: the plunger piston opening in its the end position a connection between the brake cylinders and a reservoir; and a pressurizing valve opening in the direction of the reservoir is disposed in the connection.

The advantage of this design according to the invention is in the first place that, while the supplementary braking arrangement operates at full output, a complete pressure decrease in the wheel cylinders will be ensured even if the volume increase achieved by the displacement of the plunger piston is not sufficient to receive the pressure-fluid volume taken up by the braking system due to elasticities. When the brakes are actuated, the pressurizing valve ensures that the plunger piston is movable away from its end position by means of the pressure of the pressure-fluid source, so that there is no longer an open connection between the pressure-fluid source and the reservoir which would lead to a failure of the braking system.

In an advantageous embodiment of the invention, a seat valve is provided in the connection between the wheel cylinders and the reservoir, coaxially of the plunger piston and closing in the direction towards the reservoir, and the plunger piston has a tappet pushing the seat valve open in the end position of the plunger piston. In this embodiment, the conventional pressure-regulating valve merely has to be provided with an additional tappet at the plunger piston. All other parts of the pressure-regulating valve may remain unchanged.

In another embodiment of the invention, the pressurizing valve is disposed between the seat valve and the reservoir, and a throttling arrangement is provided between the seat valve and the pressurizing valve. This embodiment has the advantage that pressure surges which may occur when the seat valve opens will not cause damage to the closure member of the pressurizing valve.

In a further advantageous embodiment, the seat valve, the throttling arrangement and the pressurizing valve are disposed in one common housing block adapted to be sealably seated on a housing portion of the pressure-regulating valve including the plunger piston. By virtue of this measure, it is possible to provide a conventional pressure-regulating valve optionally with or without the arrangement for connecting the wheel cylinders with the reservoir in the plunger piston end position.

In still another advantageous embodiment of the invention, the plunger piston is designed as a stepped piston whose smaller piston portion carries the tappet, with the tappet extending freely out of an opening of that section of the housing portion which accommodates the smaller piston portion.

Such a pressure-regulating valve design requires no sealing between the tappet and the housing. The pressure from the wheel cylinders acts, after opening of the seat valve, upon the front end of the smaller piston portion of the stepped piston. When calculating the effective surfaces of the plunger piston and the shifting device, this additional force may be taken into account so that the function of the pressure-regulating valve is not adversely affected thereby.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
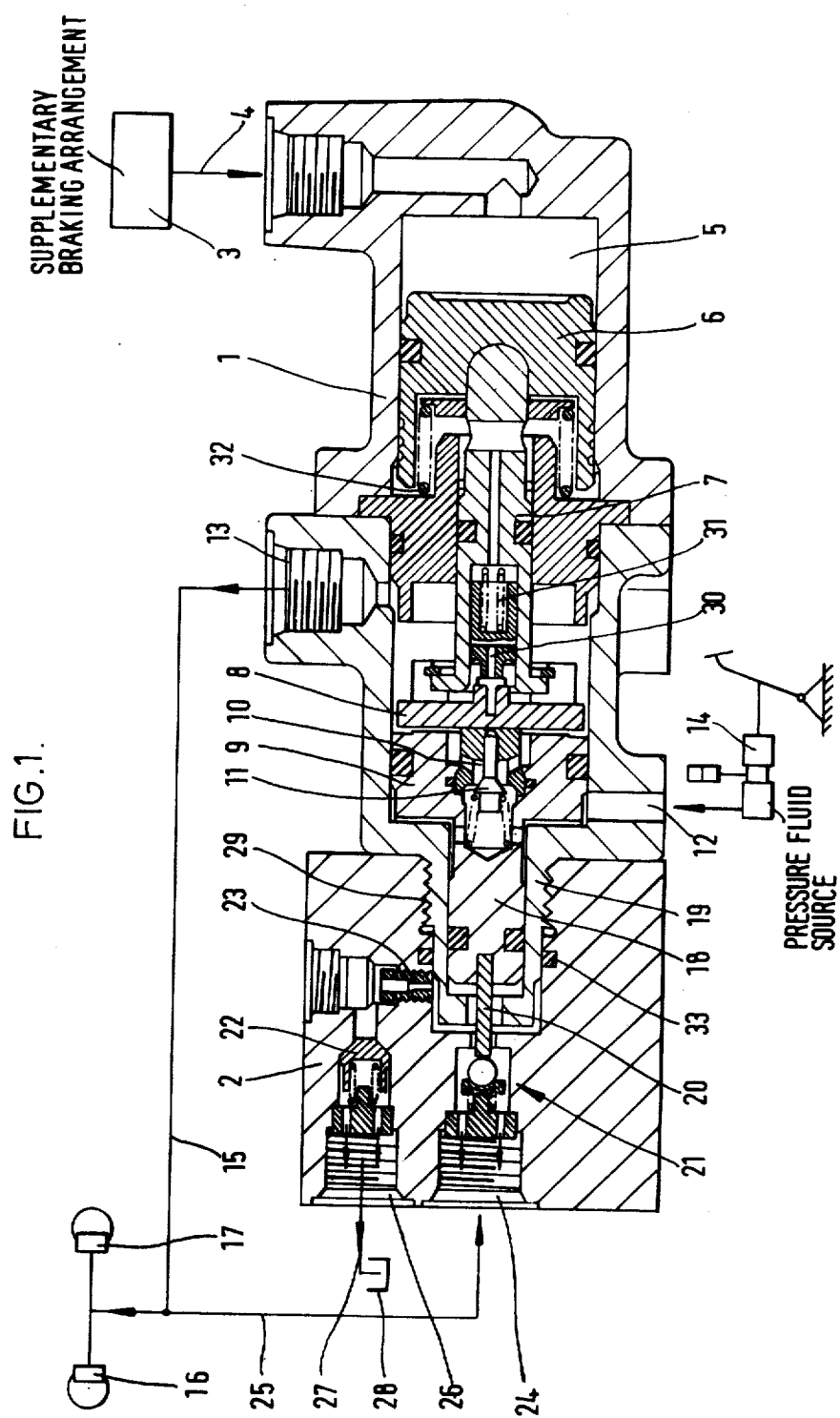
FIG. 1 shows a longitudinal cross-section through the pressure-regulating valve constructed in accordance with the principles of the present invention, with the supplementary braking arrangement being in full effect and the normal friction brakes being inactive.

The pressure-regulating valve shown in FIG. 1 comprises a housing portion 1 and a housing block 2. The housing portion 1 includes substantially known components. The pressure from a supplementary braking arrangement 3, which is termed a retarder, acts through a line 4 in a pressure chamber 5 of housing portion 1 onto a piston 6. Piston 6 has a shifting device 7 so that the pressure prevailing in pressure chamber 5 can act, through shifting device 7 and a stop bar 8, onto a plunger piston 9. Plunger piston 9 has a passageway 10 adapted to be closed by a closure member 11. In the illustrated position of stop bar 8, closure member 11 is in an open position, thereby enabling the flow of pressure fluid from an inlet port 12 through passageway 10 to outlet port 13 of the pressure-regulating valve. Inlet port 12 is schematically shown in the drawing, connected with a pressure-fluid source 14 which is illustrated as a pedal-actuated pressure-control valve. A line 15 leads from outlet port 13 to wheel cylinders 16 and 17 of the mechanical brakes.

With its smaller piston portion 18, plunger piston 9 extends in a sealed relation into a housing section 19 of housing portion 1. From its front end, a tappet 20 extends out of housing section 19.

The components relevant to the present invention are substantially in housing block 2.

First, a seat valve 21 is concerned which is arranged coaxially to the plunger piston and can be brought into an open position by tappet 20. A pressurizing valve 22 is disposed in parallel to seat valve 21. A throttling arrangement 23 is located between pressurizing valve 22 and seat valve 21. Housing block 2 has a pressure-fluid inlet port 24 communicating with wheel cylinders 16 and 17 through a line 25 in the same manner as outlet port 13. Further, housing block 2 has a pressure-fluid outlet port 26 from which a line 27 leads to a reservoir 28.

In respect of the structural design, it is to be noted that housing block 2 is screwed on the housing section 19 of the housing portion 1 by means of a thread 29 and sealed relative to housing section 19 by means of seals 33.

For the proper functioning of the pressure-regulating valve, the following details are of importance:

In the shifting device 7, there is provided an auxiliary piston 30 which is not firmly connected with stop bar 8 and can be displaced in the direction of piston 6 against the force of a spring 31. Auxiliary piston 30 is acted upon by the wheel-cylinder pressure in such a manner that it moves in the direction of piston 6 as the wheel-cylinder pressure increases, i.e., to the right when viewing the drawing.

The operation of the pressure-regulating valve illustrated is as follows:

First, reference will only be made to FIG. 1. In the operating position illustrated in FIG. 1, the supplementary braking arrangement 3 is fully effective. As a result, piston 6 is displaced to the left when viewing the drawing against the force of spring 32. Shifting device 7 displaces plunger piston 9 fully to the left when viewing the drawing so that tappet 20 will have brought seat valve 21 into an open position. Auxiliary piston 30 acts through stop bar 8 upon closure member 11 so that the latter is in the open position. By these means, a connection is established between wheel cylinders 16/17 and reservoir 28 through line 25, seat valve 21, throttling arrangement 23 and pressurizing valve 22. Any braking pressure possibly present in the wheel cylinders would be reduced towards reservoir 28 to such an extent as predetermined by pressurizing valve 22.

Figure 2:
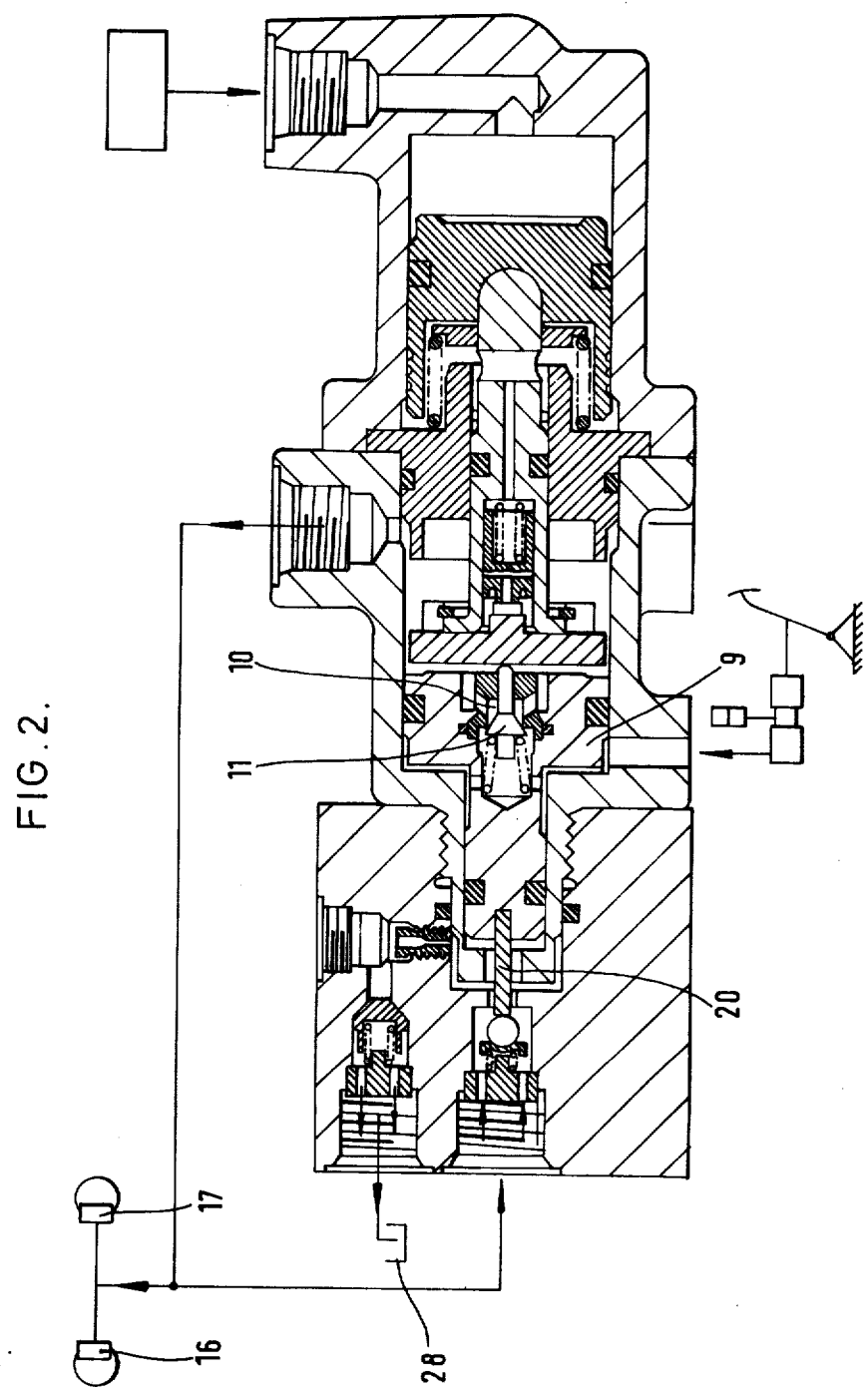
FIG. 2 shows a longitudinal cross-section through the pressure-regulating valve of FIG. 1, with the supplementary braking arrangement being in full effect and the mechanical braking arrangement commencing to operate.

If the mechanical friction brake is actuated additionally, pressure fluid will flow from the pressure-fluid source 14 through inlet port 12 and passageway 10 to outlet port 13 and further to the wheel cylinders through line 15. This pressure acts also on auxiliary piston 30, thereby displacing it together with stop bar 8 to the right when viewing the drawing. This is illustrated in FIG. 2. As a result of this displacement, closure member 11 closes passageway 10. The pressure increase occurring during actuation of the mechanical friction brakes causes the plunger piston 9 to move increasingly to the right when viewing the drawing, thereby providing for an increase of the pressure in wheel cylinders 16 and 17, because the movement of tappet 20 caused seat valve 21 to become closed and the connection to reservoir 28 to be blocked.

Figure 3:
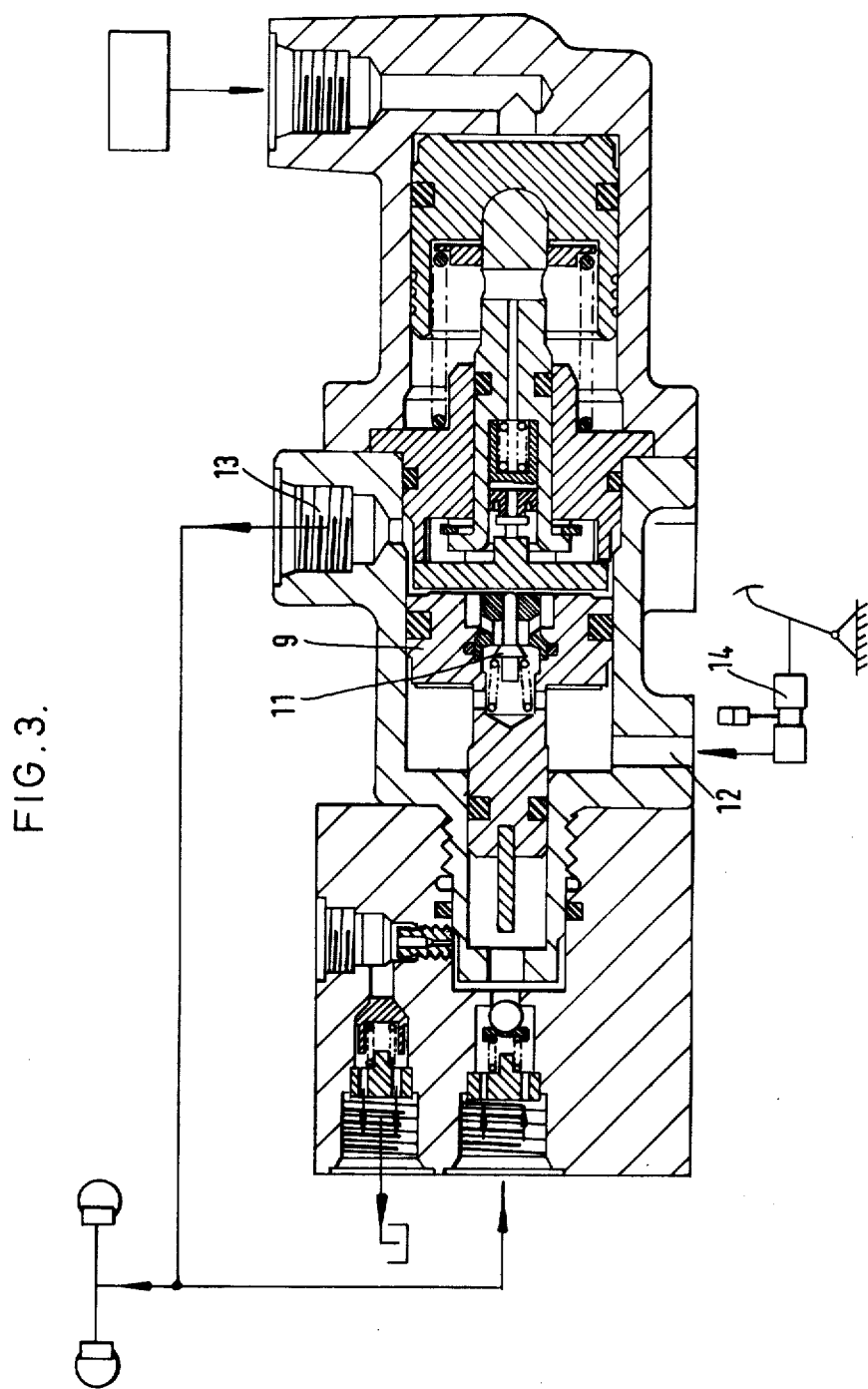
FIG. 3 shows a longitudinal cross-section through the pressure-regulating valve of FIG. 1 in an operating state in which the mechanical braking arrangement is fully operated and the supplementary braking arrangement is not operated.

FIG. 3 shows the pressure-regulating valve according to the invention in an operating position in which the supplementary braking arrangement displays no effect. This enabled plunger piston 9 to move completely to the right when viewing the drawing, as a result of the pressure from pressure-fluid source 14. Closure member 11 moves to the left as viewed in the drawing and is in the open position again so that there is free flow of pressure fluid from inlet port 12 to outlet port 13.

While I have described above the principles of my invention in connection with specific apparatus it is to be clearly understood that this description is made only by way of example and not as a limitation to the scope of my invention as set forth in the objects thereof and in the accompanying claims.

I claim:

1. An improvement to a pressure-regulating valve for vehicular braking systems, said pressure-regulating valve being inserted between a brake-pedal-controlled pressure-fluid source and a plurality of wheel brake cylinders, said pressure-regulating valve including a housing portion having a longitudinal axis; a piston disposed within said housing portion coaxial of said axis in communication with a supplementary braking arrangement; a shifting device disposed within said housing portion coaxial of said axis and fastened to said piston remote from said supplementary braking arrangement; a plunger piston disposed within said housing portion coaxial of said axis; an auxiliary piston disposed within said shifting device coaxial of said axis and in a controlling relationship with said plunger piston, said auxiliary piston being displaceable in a direction away from said plunger piston against a force of a spring; and a pressure chamber disposed within said housing adjacent said plunger piston in communication with said brake-pedal-controlled pressure-fluid source and said plurality of wheel brake cylinders; said plunger piston having a pressure-fluid passageway therein disposed coaxial of said axis and a closure member for said passageway, said passageway communicating said brake-pedal-controlled pressure-fluid source with said pressure chamber, said closure member being movable into an open position by said auxiliary piston; the volume of said pressure chamber being variable as a result of the displacement of said plunger piston into an end position by said piston, said shifting device and said auxiliary piston; said displacement being dependent on the braking action of said supplementary braking arrangement; said improvement comprising:

- a housing block sealed to and seated on said housing portion;
- a seat valve disposed in said housing block coaxial of said axis and disposed in a connection between said plurality of wheel brake cylinders and a reservoir;
- a tappet secured to said plunger piston to push said seat valve open in said end position of said plunger piston; and
- a pressurizing valve disposed in said housing block in a parallel relationship with said seat valve and disposed in said connection, said pressure-regulating valve operating such that said seat valve is controlled by the location of said tappet acted upon by pressure from said supplementary braking arrangement and brake-pedal-controlled pressure-fluid source.

2. An improvement according to claim 1, wherein said pressurizing valve is disposed between said seat valve and said reservoir; and further including a throttling arrangement disposed in said housing block between said seat valve and said pressurizing valve.

3. An improvement according to claim 1, wherein said housing block is screwed on said housing portion by threads.

4. An improvement according to claim 1, wherein said plunger piston is a stepped piston whose smaller portion carries said tappet which extends freely out of an opening of a small diameter portion of said housing portion which accomodates said smaller portion of said stepped piston.

* * * * *